May 30, 1933.  W. W. LOHRER  1,911,633
POULTRY NEST
Filed Sept. 4, 1929   3 Sheets-Sheet 1
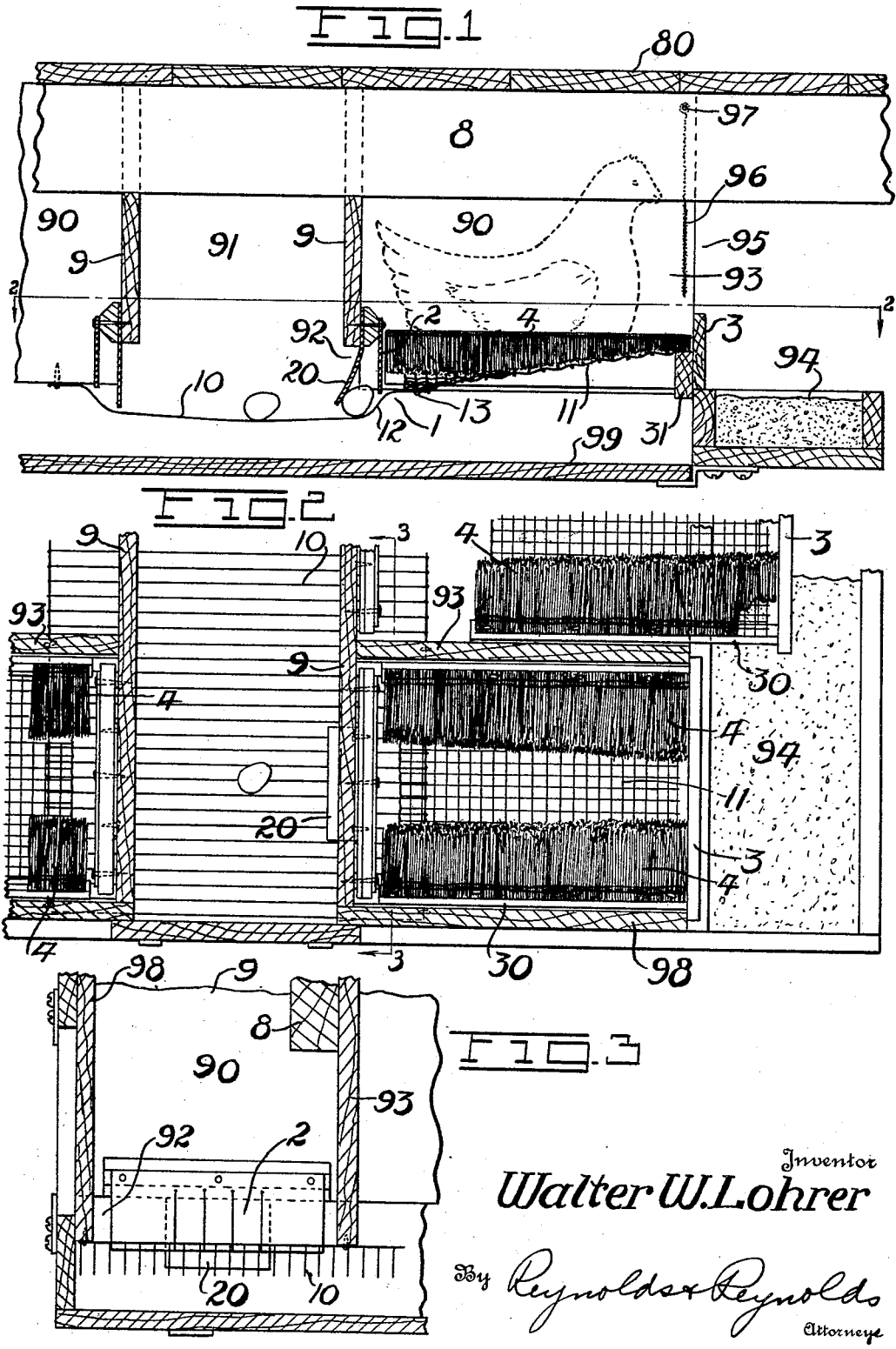
Inventor
Walter W. Lohrer
By Reynolds & Reynolds
Attorneys

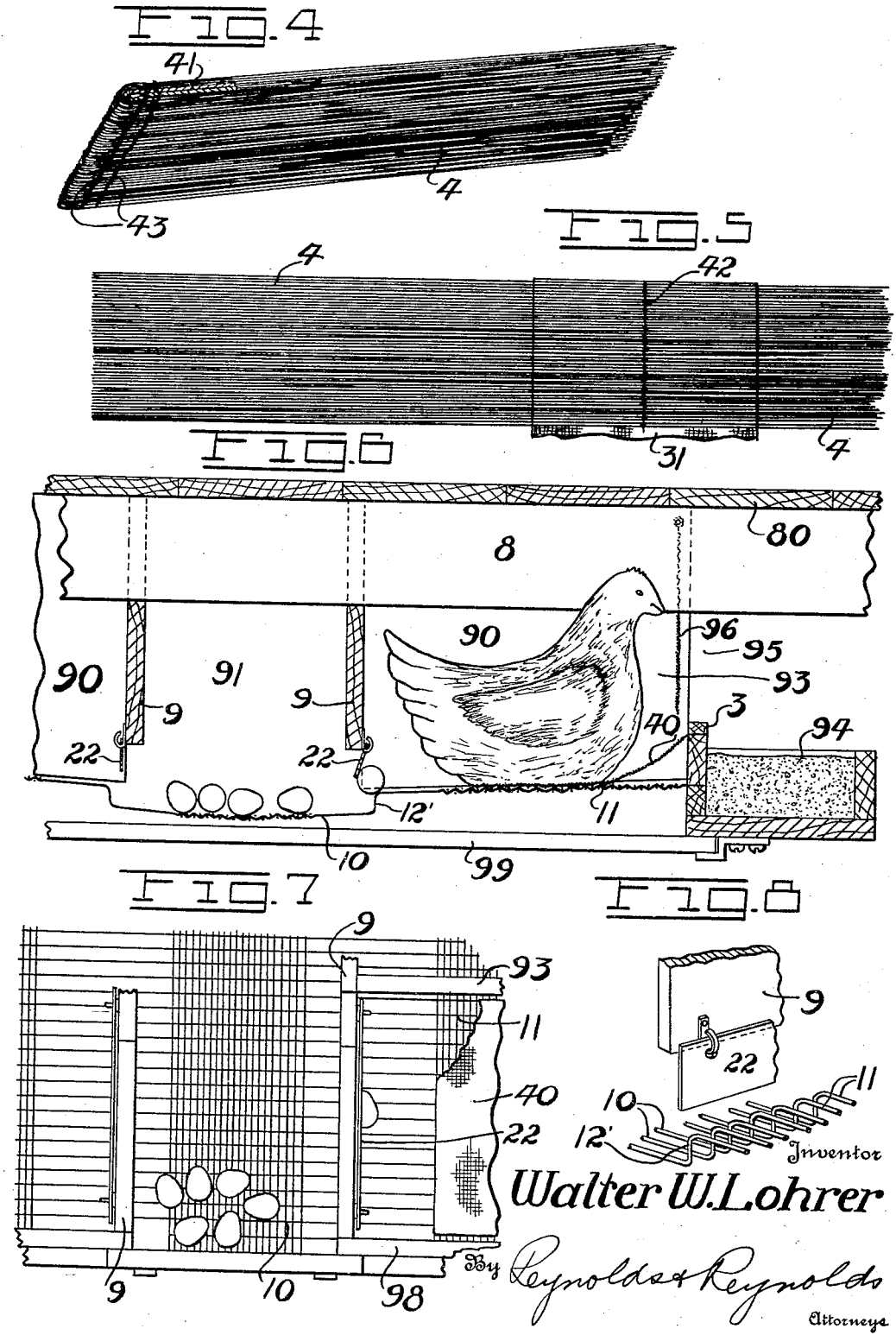

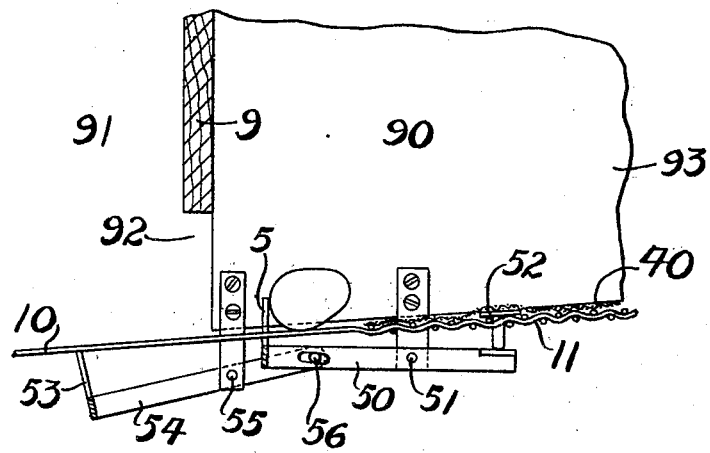
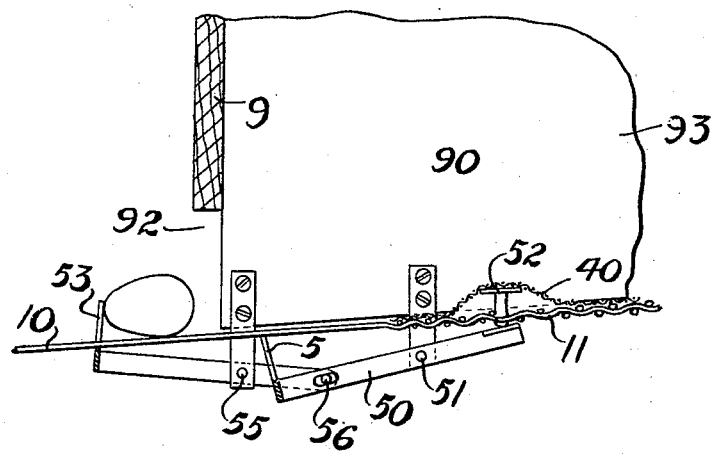

Patented May 30, 1933

1,911,633

UNITED STATES PATENT OFFICE

WALTER W. LOHRER, OF NEAR OLYMPIA, WASHINGTON

POULTRY NEST

Application filed September 4, 1929. Serial No. 390,241.

My invention pertains to poultry nests and is directed particularly to nests of the general type shown in my copending application, Serial No. 299,730, filed August 15, 1928. The present application is a continuation in part of my application, Serial No. 313,798, filed October 20, 1928.

My principal object is to maintain the egg in first class condition from the time it is laid until it is collected, and to take all precautions against lowering the grade of the egg by such accidents as cracking, checking, breaking, or dirtying, and to protect the egg against molestation by a hen in the nest.

The quality of eggs for market is reduced in a number of ways; by becoming soiled, which occurs either by contact with dirt carried into the nest on the feet and legs of the hen and transferred thence to the nest, or from eggs which are broken in the nest; by cracking or checking caused by pressure or movement of the hen in contact with the egg or eggs or by striking of the eggs together; or by imperfect or too rapid cooling of the egg after it is laid. While dirt affects only the appearance, and consequently, the grade or market value of the eggs, their keeping quality is lessened by cracking or checking, or if the animal heat is not removed from the eggs immediately after they are laid. Yet this cooling cannot occur too rapidly or the eggs will dry out too quickly, and will be light in weight and of poor keeping quality. My application, Serial Number 299,730 referred to above is principally concerned with the means to prevent dirtying of the eggs by dirt adhering to or carried in by the legs of the hen, and while my present nest is particularly designed to cooperate with such a nest as is shown in the application referred to, and to aid in the accomplishment of the object thereof, it is one of my principal objects in the present application to provide a nest by the use of which cracking is eliminated by causing the eggs to be automatically removed from the laying chamber as soon as it is laid, and checking is eliminated and the eggs cooled by halting them at a place where they are permitted to cool and dry sufficiently rapidly to preserve their keeping qualities to the best advantage, but where they will not be so rapidly cooled as to harm them. While they are removed from the laying chamber as rapidly as possible they are not moved a greater distance than is necessary while wet, so that they will avoid picking up dirt from the nest, which would not adhere to them when dry. The danger of breaking or checking or cracking is further eliminated by the provision of means which will to a certain extent prevent the eggs from grouping together closely or striking one another with any force.

So far as concerns the removal of the eggs as soon as laid from the laying chamber to the collecting chamber a nest formed in accordance with my application, Serial No. 299,730 is entirely satisfactory, but occasionally a hen would enter the nest desiring to set upon eggs, and would manage to draw eggs from the collecting chamber through the aperture by which communication was had with the laying chamber and into the laying chamber, and thus she might gather several eggs beneath her. This of course, was an encouragement for her to set, and in addition lowers the quality of these eggs. While my application, Serial No. 313,798 provided a means to prevent the withdrawal of eggs from the collecting chamber into the laying chamber, there were occasions when the hen caught her head in the aperture, and being unable to withdraw it, in her struggles became choked, and occasionally hens were injured or lost from this cause. It is one of the objects of my improved nest to provide means whereby a positive stop may be put to the practice of withdrawing eggs for setting, and without danger of injury to the hen.

Similarly the arrangement made in my nest as described in both of the applications referred to above for keeping the eggs from getting dirty, were quite generally satisfactory, but occasionally masses of dirt would collect upon the floor of the laying chamber, or a soft shelled egg would be broken and would remain in the laying chamber, and this would be the means of dirtying some eggs following thereafter before the dirty surfaces could again become coated, or of carrying over into the collecting chamber particles of feathers, dirt and the like to make dirty eggs already laid. It is therefore a second major object of this improvement to provide means whereby all dirt is permitted to drop without hindrance from the floor of the laying chamber to the bottom board or droppings board beneath, so that it may not pass into the collecting chamber, and to provide means whereby any soft shelled eggs in particular will drop without difficulty through the floor without leaving any traces or remains to make dirty future eggs.

In the summer time, particularly, it has been my experience that dust will penetrate throughout the nest and deposit itself upon all of the nest, including the floor, this dust being occasioned principally by the scratching of the hen, and that a new laid egg if permitted to roll along the bottom of the nest for any considerable distance, will pick up this dust and will have to be graded as a dirty egg. Accordingly, it is my object, in association with the other objects above, to provide a means whereby the egg can be removed from the laying chamber, but halted as soon as possible and held where it is not possible to draw it back into the laying chamber, but where it may be cooled and dried and then advanced into the collecting chamber when a new egg is laid in the particular nest chamber, the new laid egg pushing on the first laid egg and taking its place.

It is also an object to provide a nest so constructed and with a separable or removable nest bottom, that when any dust or dirt has by chance collected in the chamber it may be easily and quickly removed.

It is a further object to provide in such a nest a simulation of straw, which renders the nest more attractive to the hen, but formed of such material and assembled in such a manner that it will not interfere with the proper cleansing of the nest or the rolling of the egg therethrough to the collecting chamber.

It is also an object to provide devices of the general character indicated above, which will be simple and inexpensive and which will operate certainly and will not be liable to get out of order or to require attention.

My invention comprises the novel parts and the novel arrangement of elements of the nest as shown in the accompanying drawings, described in this specification, and as will be more particularly pointed out by the claims which terminate the same.

In the accompanying drawings, I have shown my invention in forms which are now preferred by me, some being adapted for certain uses and certain others may be of advantage for different reasons.

Figure 1 is a longitudinal section through a portion of the nest, showing the manner of use.

Figure 2 is a plan view of the same with the covering boards and supports omitted.

Figure 3 is a transverse section on the line 3—3 of Figure 2.

Figure 4 is a detail in perspective of the fringe which I have employed.

Figure 5 is a plan view of the fringe in an incomplete stage.

Figure 6 is a longitudinal section thru a portion of a modified nest.

Figure 7 is a plan view of this modified nest.

Figure 8 is a detail in perspective of a portion of such a nest.

Figure 9 is a detail section of another modification, and Figure 10 is a view of the same in another position.

This type of nest is made up with transverse partitions 9, defining a laying chamber or chambers 90 and a collecting chamber 91, which may be common to a number of laying chambers. Communication is had between the chambers 90 and 91 by an aperture 92 beneath the transverse partition 9, which is so spaced from the floor, indicated in general by the numeral 1, as to permit an egg to roll thereunder, the floor in the laying chamber, at least, being inclined toward the aperture 92. Preferably, this floor is trough-like, inclined toward the center from the sides, so that the eggs will always tend to pass through the aperture at a central point. Longitudinal partitions 93 may separate one laying chamber from an adjacent laying chamber.

As in my preceding applications, a lighting board or trough 94, of any usual or desired construction, may be placed at the single entrance 95, which is opposite the partition 9, and a curtain 96 may be hung by its upper edge over this entrance, permitting the hen to enter, yet maintaining the interior of the nest dark. It is a peculiarity of hens in a nest that they will face the light, hence in order that the hen may face toward the entrance 95 to the laying chamber, causing her to drop the egg at the rear end of the chamber, where it has but a short distance to roll, and less chance of picking up dirt, the curtain 96 may stop short of the sill which gives entrance to the nest, and the entire nest may be covered in some manner, as by supporting it beneath the droppings board 80, forming part of the usual chicken house. A bottom board 99 is usually provided lying beneath the bottom 1 of the nest to close in the bottom, so that no light may penetrate therethrough, and serving also to keep from the eggs any draft which might tend to cool them too quickly, yet admitting sufficient air that they may be cooled and dried properly, as is desirable.

While the support of the nest is immaterial, it may be pointed out that it is shown as supported by rods 97 which pass thru the outer wall 98 and the partitions 93, and which serve if desired as a support for the curtain 96. This rod also passes thru a beam 8 or like overhead member, which may be the means which support the droppings board 80 of the chicken house. Thus the entire nest may be taken down for cleaning or inspection by simply removing the rods 97. The individual nests themselves may be taken out of the nest casing without taking down the entire casing in a manner which will be explained hereafter.

In order that an egg laid in the chamber 90 will positively move into the collecting chamber 91, I prefer that the inclination of the bottom 11 of the laying chamber be increased at the aperture 92, as is indicated at 12, so that the egg will have the added emphasis of the steeper incline at 12 to bring it from the bottom 11 of the laying chamber to the bottom 10 of the collecting chamber, at a lower level. However, this tendency is checked by a means and for a purpose which will be made clear hereafter, so that the egg does not immediately pass from the laying chamber into the collecting chamber, but only after an interval during which it is permitted to cool and dry.

As has been indicated, it is not desirable to let the wet egg roll over a nest bottom, which may have a coating of dust thereon, and in order to stop the egg as quickly as possible, yet to protect it, and in particular to prevent the hen from drawing it back into the nest chamber, I employ two means at the aperture 92, which in the preferred form take the form of two flaps 2 and 20. The first of these, the flap 2, is of such material and so formed that it will check the egg but will permit it to roll past it, and the check which the egg receives from the flap 2 will cause it to be checked and held by the flap 20 so that it may not escape into the collecting chamber 91. Here it is held between the two flaps 2 and 20, as may be seen in Figure 1, until a succeeding egg rolls down the incline of the nest bottom 11 and strikes the flap 2, pushing the previously laid egg in advance of it, the second egg then entering the space between the flaps 2 and 20.

I have found that reasonably heavy sheet rubber is suitable for the flap 2 since it has sufficient stiffness to maintain itself always in position to close the aperture and to prevent the hen from pushing it aside and drawing the egg back, yet if it is slitted as is indicated in Figure 3 it will readily permit the egg to pass out of the laying chamber. Also, if made of rubber, it serves as a cushion to prevent damage to the previously laid egg or to the new laid egg, which pushes on the first egg, at the instant of impact. I have found a stiff fabric, as for instance, fabrikoid, to be suitable for the flap 2, having sufficient stiffness to press against the egg and hold it frictionally, yet not holding it so rigidly that it may not be pushed on purely by the weight of a new laid egg, pressing it on from the laying chamber.

In Figures 6, 7 and 8 I have shown a single flap only and have shown the break 12 as substantially perpendicular. The flap 22 in this instance may be made of such material as sheet iron or tin. Its weight is just sufficient to let the egg down over the break at 12' without injury.

It will be noted in each form that the bottom 11 of the nest itself is reticulated in the main, altho the cross wires are omitted near the aperture, which permits the egg to roll freely as it approaches the aperture, and further permits foreign matter and soft shelled eggs in particular to drop therethrough without rolling on into the collecting chamber. Further, the collecting chamber itself may be of slotted or skeleton construction, though its central portion may be reticulated or foraminous, as shown in Figures 6 and 7. I prefer however, that the bottom 10 of the collecting chamber be of slotted or skeleton construction as is best shown in Figure 2 since this offers the fewest lodging places for dust and dirt.

In Figures 9 and 10 is shown a mechanically operated stop for the eggs. A comblike gate 5 is supported on one end of a lever 50, pivoted at 51 near its opposite end. A treadle 52 upon this inner end of the lever 50 is positioned to be depressed by a hen in the nest—it may be under the canvas bottom 40—and when the treadle is depressed the gate 5 is raised, as seen in Figure 9. A second gate 53, upon one end of a lever 54 pivoted at 55, and controlled in its movements by the connection at 56 to lever 50, is lowered at such times.

When the hen has laid an egg she leaves the nest, and the treadle 52 rises under the influence of the unbalanced lever 50, permitting the newly laid egg to roll from the gate 5, where it had been momentarily halted, to the adjacent gate 53, now upraised, as seen in Figure 10. Upon entrance of another hen the treadle is depressed, and the previously laid egg is released to roll further into the collecting chamber 91. At the same time the gate 5, positioned at about the aperture 92, rises again and prevents the hen from meddling with eggs in the collecting chamber.

To enable the individual nests to be taken out and cleaned, should this be found desirable, I have found it convenient to mount the nest bottoms 11 upon frames consisting of the side bars 30 and an end bar or sill 3 joining the side bars, this sill having an inner bottom flange 31, which as may be seen in Figure 1 hooks over the inside edge of the lighting board or tray 94 to hold the nest in position within the casing. The inner end of the nest may conveniently be supported over the edge of the bottom 10, which may have a marginal wire 13 to strengthen it for this purpose. By this means each individual nest bottom may be taken out and washed or otherwise cleansed. For instance, a hose may be turned upon it. Such a nest in process of being removed is indicated in Figure 2.

It has been considerable of a problem in nests to provide a bottom which simulates the straw which hens seek for in nests, yet to make the nest thoroughly clean so that the eggs will not be dirtied, or dirt caught and held in the nest. To this end, I provide a fringe indicated in general at 4, which lines either side of the nest. This fringe is made of a bristle-like substance which tends to remain straight and will not curl and kink, and which consequently permits dirt to slide over it. The material I prefer is white tampico, which is the fibre of a cactus grown in Mexico. This is hard and somewhat slippery, and does not permit dirt to accumulate upon it. Moreover, it is stiff and bristle-like and simulates the appearance of straw. It may be washed when that is necessary, though I have found that nests constructed in this fashion will keep clean for months without special cleansing. Such a fringe serves as a means for picking up the dusting powder or gypsum which may be placed in the lighting trough 94, according to my application, Serial No. 299,730. In another form such a cover for the bottom 11 may be a fabric or canvas sheet 40, which is secured to the sill 3 of the nest and which extends over this bottom 11 (see Figure 6). Such a canvas, however, should not extend to the inner end of the laying chamber 90, but should stop at about the edge of the slotted portion of the bottom.

A fringe such as I use may be formed, as I have stated, of white tampico fibre, laid side by side and distributed along a centrally positioned fabric strip 41. (Figures 4 and 5). It may be sewed as indicated at 42 to secure it preliminarily to the strip 41, and may then be folded over the strip and sewed again as indicated at 43 to further secure the fibres to the strip and to make the fibre mass somewhat thick and bushy. The fibres may further be retained by running a little glue along the folded edge of the fringe. It is then secured to the side bars 30 of the nest by tacking or other suitable means.

What I claim as my invention is:

1. A poultry nest partitioned to define a laying chamber and a collecting chamber, communicating through an aperture at the floor level, the floor in the laying chamber sloping towards said aperture to induce eggs in the laying chamber to roll through the aperture into the collecting chamber, and means for halting an egg in the aperture pending its drying.

2. A nest as in claim 1, the means for halting the egg including a yieldable flap of such character as to restrain the egg until acted upon by an additional force.

3. A nest as in claim 1, the means for halting the egg including a fabric strip of sufficient stiffness to restrain the egg until it is advanced by the succeeding egg.

4. A poultry nest partitioned to define a laying chamber and a collecting chamber, communicating through an aperture at the floor level, the floor in the laying chamber sloping toward the aperture to induce eggs in the laying chamber to roll through the aperture into the collecting chamber, two egg-engaging means, one for halting an egg in the aperture until positively dislodged, and the other to prevent return of the egg, so halted, into the laying chamber.

5. A nest as in claim 1, including means positioned so as to be interposed to protect an egg halted in the aperture from being struck directly by another egg coming from within the laying chamber.

6. A nest as in claim 4, the bottom of the laying chamber being sloped from each side to define a trough to direct eggs through the aperture from the egg-laying chamber to the collecting chambers, the egg-engaging means including two yieldable closures for said aperture spaced to maintain an egg therebetween, the first closure being yieldable as the egg rolls down the inclined floor of the laying chamber, and the second halting the egg until it is pushed forward by a succeeding egg.

7. A nest as in claim 4, the egg-engaging means, including two yieldable flaps at the aperture spaced in the direction of movement of the egg, the floor between said flaps having an increasing inclination, whereby the egg passes the first flap and is halted by the second, the first flap protecting it from the laying chamber, until it is pushed past the second flap by a succeeding egg engaging it through the first flap.

8. A nest as in claim 4, the egg-engaging means including spaced flaps depending at the aperture, that nearest the laying chamber being of rubber, and that nearest the collecting chamber being of fabric, each in turn frictionally restraining the egg.

9. A poultry nest partitioned to define a laying compartment and a communicating collecting chamber, the laying compartment having a removable nest frame and reticulated bottom supported in said laying compartment.

10. A nest as in claim 9, the rear edge of the nest bottom resting upon the edge of the bottom of the collecting chamber.

11. A nest as in claim 9, the reticulated nest bottom overlying the edge of the bottom of the collecting chamber, the latter being of skeleton construction, and a bottom board supported beneath the laying and collecting chambers to receive the dirt dropping through their respective bottoms.

12. A poultry nest element comprising a frame, a bottom of skeleton construction supported thereon, a fringe of bristle-like character overlying the bottom, an enclosing casing, and means interengageable between said casing and the frame of the nest element for removably supporting the nest element in the casing.

13. A poultry nest as in claim 1, the floor in the laying chamber being supported by a frame supported in the nest and removable therefrom.

14. In a poultry nest, partitions defining a laying chamber having an outlet, a floor in said chamber sloping towards said outlet, said floor, inward of said outlet, being foraminous and unobstructed to permit free escape of dirt and the like.

15. In a poultry nest, partitions defining a laying chamber having an outlet, a floor in said chamber sloping towards said outlet, and a flap supported by its upper edge and adapted to close said aperture, and of a weight to be swung open by an egg rolling down said floor, and a second flap supported by its upper edge in said aperture, outwardly of the first flap, and of a weight to prevent passage of an egg without application of additional force.

16. A nest as in claim 4, the two egg-engaging means being disposed one in advance of the other, in the direction in which the egg rolls, whereby one is engaged by the egg before the egg engages the second, and the second in order of engagement retains the egg until a succeeding egg forces it into the collecting chamber, passes the first member, and is in turn restrained by the second member.

17. A poultry nest element comprising a frame, a bottom of skeleton construction supported thereon, and a fringe of bristle-like character projecting perpendicularly inwardly from margins of the nest, and overlying the bottom, the inner ends of the bristles thereof being spaced to leave the bottom exposed.

Signed at Olympia, Washington, this 29 day of August, 1929.

WALTER W. LOHRER.